No. 835,707. PATENTED NOV. 13, 1906.
N. MALONE.
CORN HUSKING MACHINE.
APPLICATION FILED MAR. 7, 1906.

4 SHEETS—SHEET 2.

WITNESSES:

INVENTOR
Nathan Malone.
By W. T. FitzGerald
Attorneys

No. 835,707. PATENTED NOV. 13, 1906.
N. MALONE.
CORN HUSKING MACHINE.
APPLICATION FILED MAR. 7, 1906.

4 SHEETS—SHEET 3.

WITNESSES:
Thos. W. Riley
Herbert D. Lawson

INVENTOR
Nathan Malone
BY
W. T. FitzGerald
Attorneys

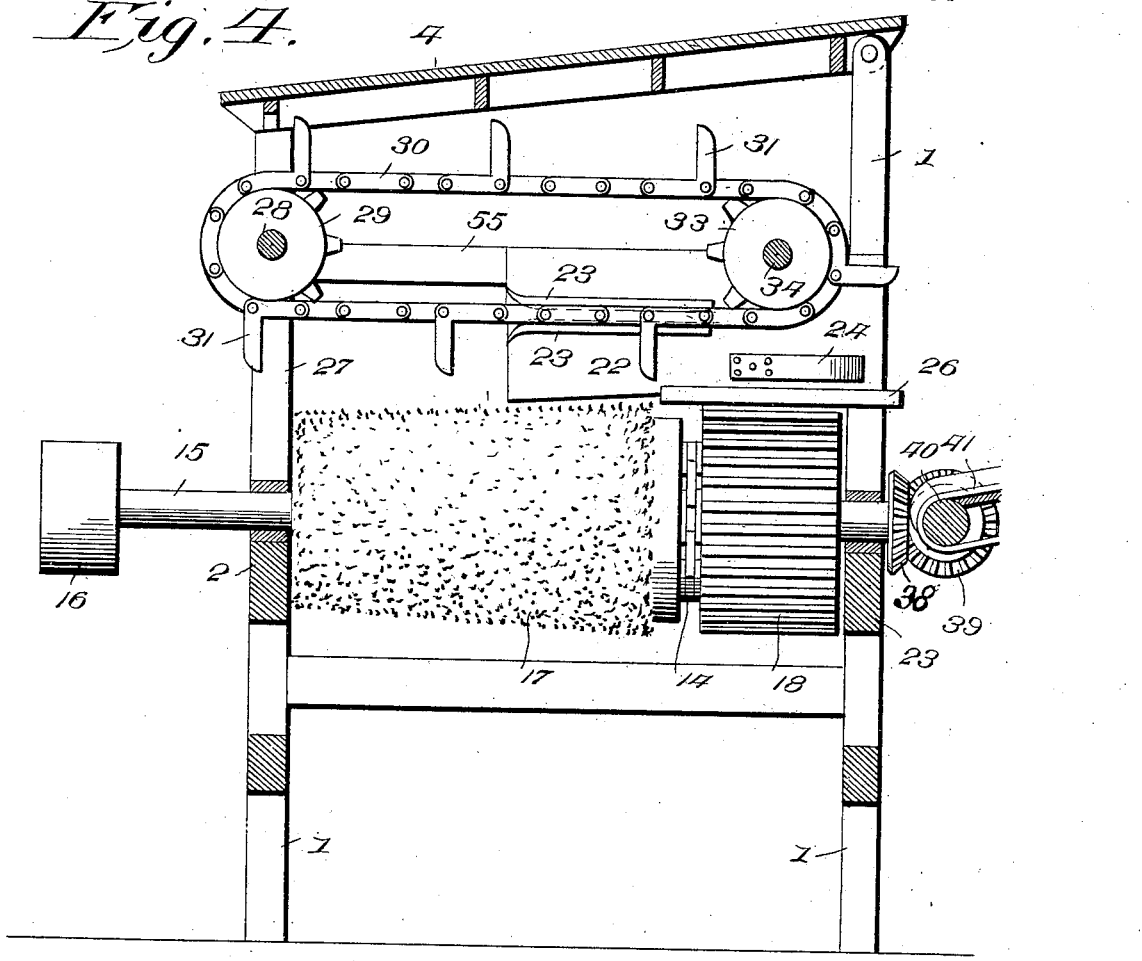

UNITED STATES PATENT OFFICE.

NATHAN MALONE, OF WEST UNION, OHIO.

CORN-HUSKING MACHINE.

No. 835,707.        Specification of Letters Patent.        Patented Nov. 13, 1906.

Application filed March 7, 1906. Serial No. 304,744.

*To all whom it may concern:*

Be it known that I, NATHAN MALONE, a citizen of the United States, residing at West Union, in the county of Adams and State of Ohio, have invented certain new and useful Improvements in Corn-Husking Machines; and I do hereby declare the following to be a full, clear, and exact description of the invention, such as will enable others skilled in the art to which it appertains to make and use the same.

My invention relates to corn-husking machines; and its object is to provide mechanism whereby ears of corn can be fed to apparatus which will thoroughly cut the husks, after which the corn is directed into mechanism which removes the husks immediately prior to the discharging of the cleaned ear from the machine.

Another object is to provide a feeding device which will automatically adjust itself to ears of different sizes.

A still further object is the provision of novel brushing and pulling mechanism whereby the husks are automatically drawn from the ear during the passage thereof through the machine.

With the above and other objects in view the invention consists of an inclined finger-board which is resiliently supported and constitutes a feed device. The fingers of this board have prongs extending from them, and rotatable pronged disks are disposed thereabove and are adapted to coöperate therewith for the purpose of tearing the husks. Discharging means are also disposed upon the disks and are adapted to discharge ears and husks from the finger-board at predetermined intervals, after which they are taken up by a rotatable brush into the path of a carrier. Said carrier conveys the corn to stripping-rolls, which grip the husks and pull them from the ear, after which said ear is automatically projected from the machine.

The invention also consists of the further novel features of construction and combination of parts, the preferred form whereof will be hereinafter made clearly apparent, reference being had to the accompanying drawings, in which—

Figure 1:
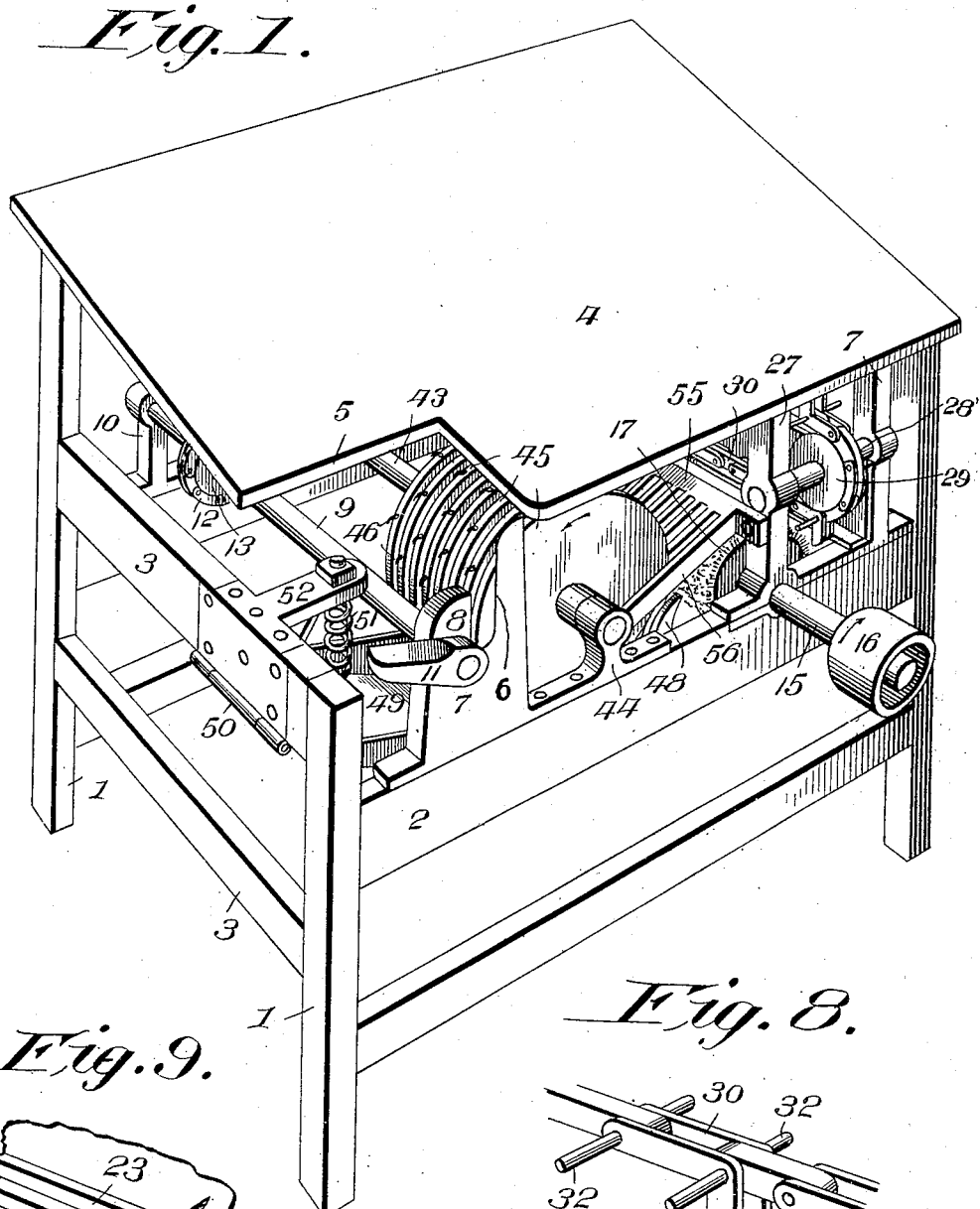
Figure 2:
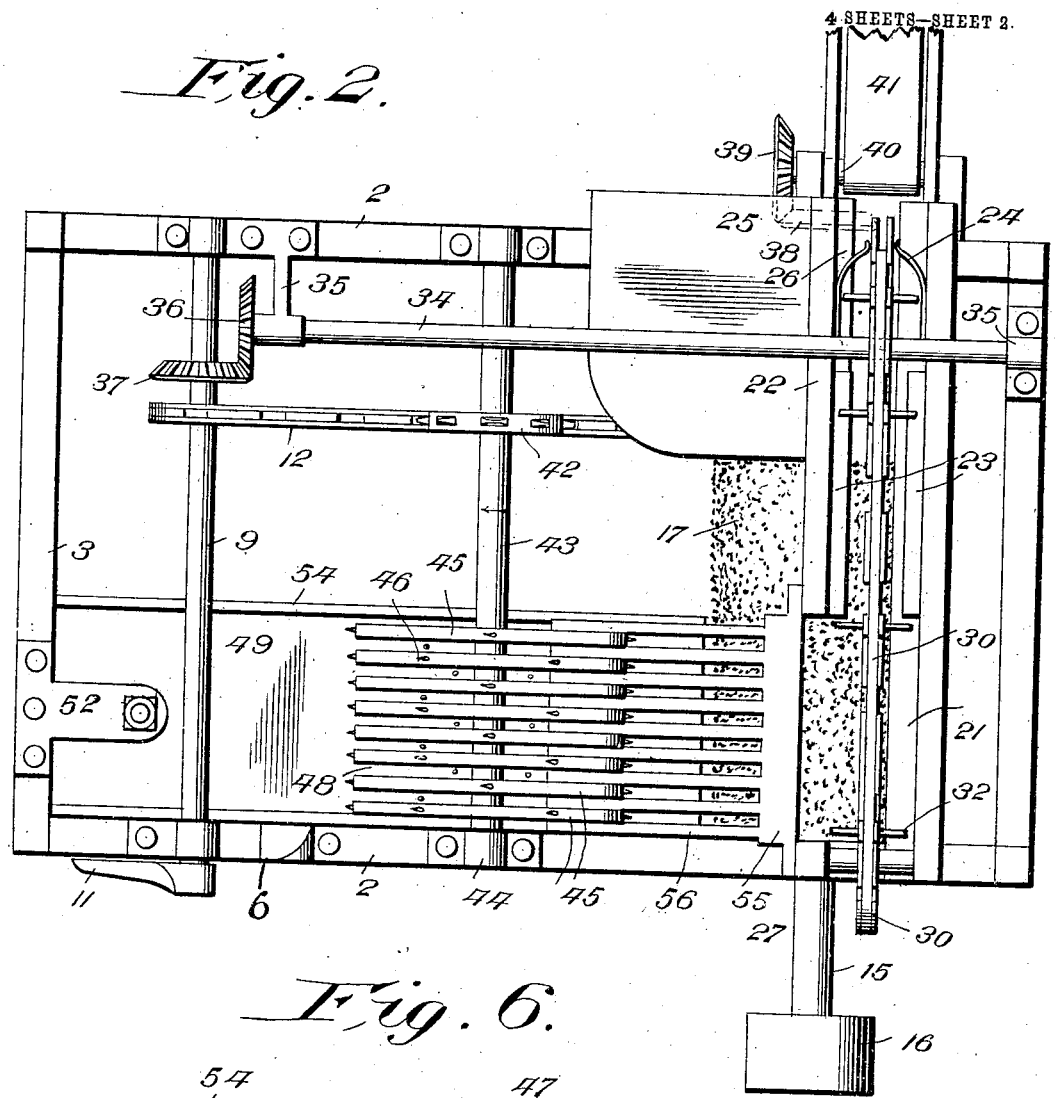
Figure 3:
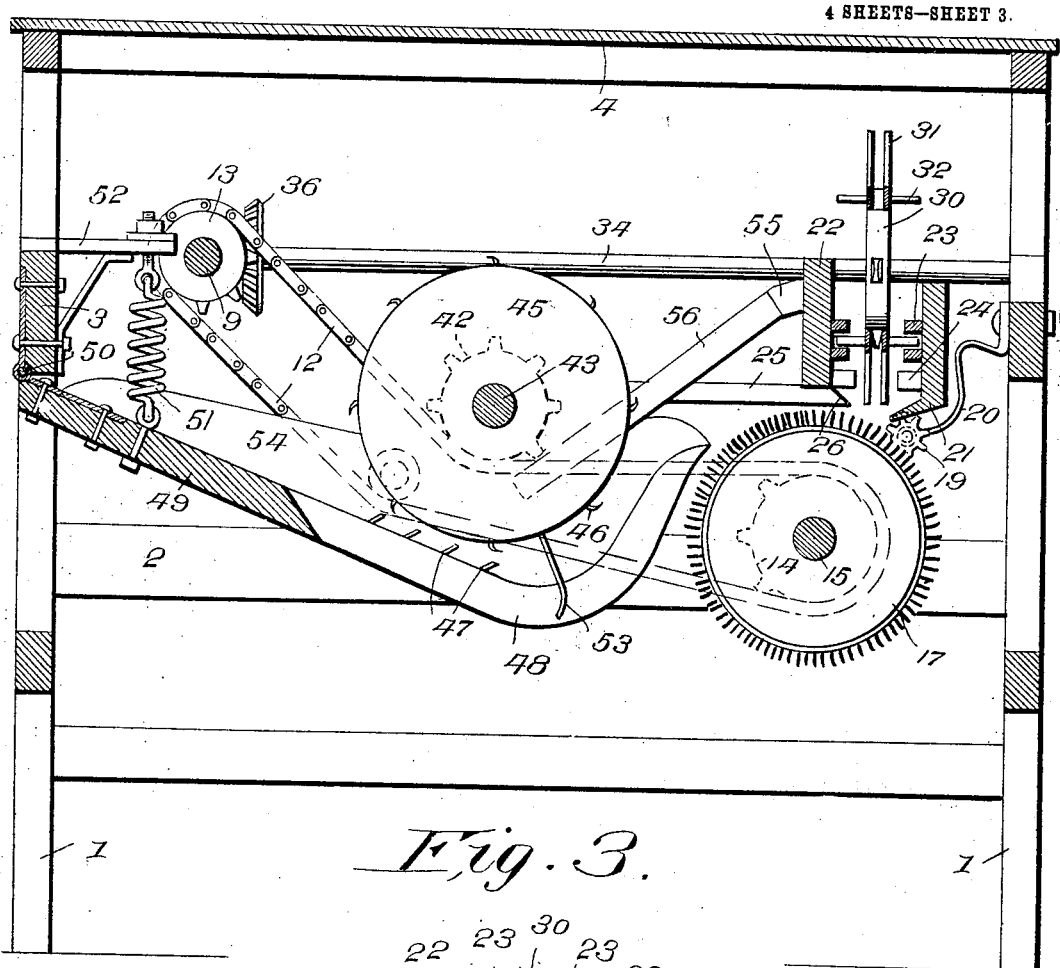
Figure 5:
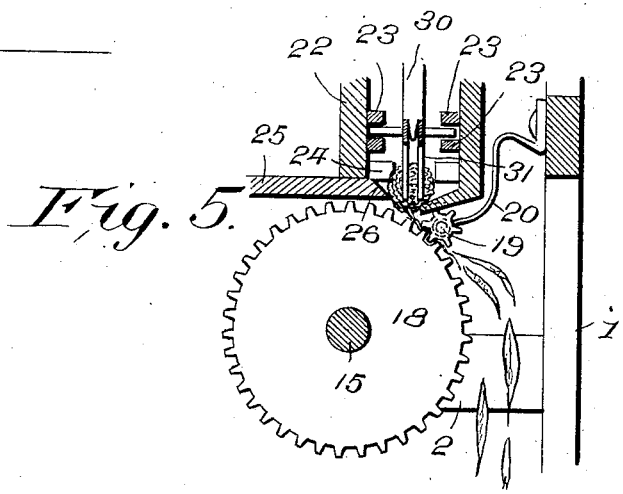

Figure 1 is a perspective view of the machine. Fig. 2 is a plan view thereof with the top removed. Fig. 3 is a vertical longitudinal section through the machine. Fig. 4 is a vertical transverse section therethrough, said section being taken between the guides of the conveyer and showing the brush and one stripping-roll in elevation. Fig. 5 is a section through a portion of the machine and showing the stripping-rolls in end view. Fig. 6 is a plan view of the finger-board. Fig. 7 is a similar view of the fingered receiver. Fig. 8 is a perspective view of a portion of the conveyer, and Fig. 9 is a similar view of one end of one of the guides of the conveyer.

Referring to the figures by numerals of reference, 1 1 are standards connected by side strips 2 and end strips 3, and three of these standards support an inclined top 4, which extends entirely over the mechanism, except at one corner, where it is cut away, as shown at 5, so as to permit the corn to be fed to the machine at that point. Secured to the upper side strip 2, under the cut-away portion 5 of the top, is a vertical stationary knife 6, mounted on a standard 7, said standard having an arm 8 projecting therefrom, which is parallel with knife 6 and constitutes a bearing for a shaft 9, mounted in a standard 10 on the other side of the machine.

A snapper or rotatable knife 11 is secured to the shaft 9 and is adapted to coöperate with the knife 6 for the purpose of severing cornstalks when placed between the knife 6 and arm 8. Shaft 9 is driven by a chain 12, which extends over a sprocket 13, secured to said shaft, said chain being operated by a sprocket 14 upon the main or drive shaft 15. This drive-shaft is journaled upon the upper side strips 2, near the rear end of the machine, and has a pulley 16 thereon adapted to be rotated by a belt. (Not shown.) Secured to the shaft 15 between one of the sides and the sprocket 14 is a tapered or frusto-conical brush 17, the beaters of which are preferably formed of narrow strips of leather. The large end of this brush is located adjacent the sprocket 14. Interposed between the sprocket 14 and the other side of the machine is a stripping-roll 18, the periphery of which is grooved longitudinally to form beads or teeth, as shown particularly in Fig. 5. These beads are adapted to mesh with similar beads or teeth formed on a small stripping-roll 19, which is mounted in spring-bearings fastened to one of the end strips of the machine. A stop-strip 21 extends throughout the width of the machine and is inclined from side to side and upward from the rolls 17 and 18 and to one side of the center thereof. This stop-strip is also inclined lengthwise so as to conform with the angle of the tapered roll 17; but that portion of the stop-strip above the stripping-roll 18 is not inclined longitudinally, but is disposed parallel with and close to the roll 18. A cross-strip 22 is disposed parallel with the stop-strip 21 and extends throughout the length of the stripping-roll 18 and to a point adjacent the central portion of roll 17. This cross-strip, as well as the stop-strip 21, has parallel inwardly-extending guides 23 thereon, which, as shown in Fig. 9, diverge at one end for the purpose hereinafter set forth. The guide-strips 23 extend partly over the stripping-roll 18, and arranged above the stripping-roll, substantially in alinement with these strips 23, are bow-springs 24, which extend inward toward each other, as shown in Fig. 2.

Extending under that portion of the strip 22 located above the stripping-roll 18 is a supporting-board 25, and that portion of said board projecting between the cross-strip 22 and the stop-strip 21 is beveled, as shown at 26, the space between said beveled portion and the stop-strip 21 being sufficient to permit an ear to lie partly supported by said stop-strip and beveled edge, but not contacting with the rolls 17 and 18.

Mounted in standards 27, located on one of the side strips 2, is a short shaft 28, on which is disposed a sprocket 29. Mounted on this sprocket is a chain 30, certain of the links of which are provided with downwardly-extending fingers 31. Laterally-extending pins 32 are disposed upon the chain at desired intervals. This chain passes around and under a sprocket 33, secured to a shaft 34, which extends longitudinally within the frame and is mounted in suitable bearings 35. A gear 36 is secured at one end of shaft 34 and meshes with a gear 37, secured to the shaft 9, hereinbefore referred to. The sprockets 29 and 33 are so located that the chain carried thereby is supported directly in the longitudinal center of the opening formed between the stop-strip 21 and the beveled edge 26 of the board 25. During the operation of the chain the laterally-extending pins 32 are adapted to enter between the diverging ends of guides 23 and to travel between said guides, so that the links of the chains will be unyieldingly supported. A bevel-gear 38 is secured to the end of shaft 15 farthest removed from gear 16, and this gear meshes with another gear 39, secured to a shaft 40, adapted to operate an elevator 41, which extends upward from the end of the channel formed between stop-strip 21 and board 25.

The chain 12, hereinbefore referred to, extends under and engages a sprocket 42, secured to a shaft 43, which extends transversely of the machine and is mounted in bearings 44 on the upper side strips 2 of the frame. This shaft has a series of similar disks 45, keyed or otherwise secured to it, adjacent one side of the frame, and each disk has prongs 46 extending from its periphery, said prongs being arranged in parallel rows. These prongs are adapted to coöperate with prongs 47, extending upward from parallel fingers 48, which extend from a finger-board 49, disposed under the cut-away portion of top 4. This board is hinged at one end to the top end strip 3, as shown at 50, and is resiliently supported in an inclined position and with its fingers close to the disks by a coiled spring 51. This spring is secured at its upper end to a bracket 52, extending inward from the strip 3, and at its lower end is fastened in any suitable manner to the board 49. The prongs 46 on the disks are adapted to work between the prongs 47 on fingers 48. Each disk has a long finger 53 extending from it, all of said fingers being arranged in a row and adapted to extend downward between the fingers 48 once during each revolution of the disks. Said fingers 48 are arranged at a tangent to the disks and curve upward and partly overlap the brushing-roll 17. Side boards 54 are disposed along the side edges of the finger-board 49 and extend from the hinged end thereof to the end of the fingers 48, so as to prevent lateral displacement of ears after they have been deposited upon the board. A receiver, consisting of a head-strip 55 and parallel fingers 56, is located above the fingers 48, its head-strip 55 being secured at one end to the cross-strip 22 and at its other end to one of the side strips 2. The fingers 56 of this receiver are inclined upward toward the head-strip thereof, while their lower free ends project between the disks 45, as shown particularly in Fig. 3.

It will be understood that when shaft 15 is rotated in the direction of the arrow shown in Fig. 1 the brushing-roll 17 will be rotated, so as to throw any material contacting therewith against the stop-strip 41 and into the path of the fingers 31 of the carrier. This carrier will be actuated by shaft 34, driven, through gears 36 and 37, by shaft 9, which in turn is operated from the drive-shaft 15 through chain 12. The snapper 11 is of course rotated with shaft 9, and disks 45 rotate in the direction of the arrow in Fig. 2, because the sprocket 42 thereon is engaged by the chain 12.

In using the machine the stalks are placed one at a time between arm 8 and knife 6, and the snapper 11 will sever it, so that the ear will drop onto the resiliently-supported finger-board 49 and slide by gravity into position between fingers 48 and disks 45. The prongs 46 and 47 will coact so as to tear the husks from the ear, and after the disks have completed one revolution the fingers 53 thereon will sweep the corn upward along the fingers 48 and discharge it onto the brushing-roll 17. This roll will carry the corn against the stop-strip 21 and into the path of the carrier-fingers 31. These fingers will engage the corn and slide it longitudinally along the stop-strip 21, the brush meanwhile rubbing the husks and tending to pull them downward from the ear and under the stop-strip 21. During this brushing and rubbing operation the carrier-fingers 31 pull the corn along the stop-strip and finally into position between said strip and the inclined edge 26 of board 25. The corn will be partly supported by these parts 21 and 26, and while above the stripping-roll 18 the husks will be gripped at this point between the rolls 18 and 19 and pulled from the cob. The springs 24 during this operation serve to hold the corn down upon stripping-roll 18 and prevent its displacement. By reason of the fact that the corn contacts with the stripping-roll, but is held against traveling therearound, the ear will be rotated so that all of the husks will be stripped therefrom. The mechanism is so timed that the stripped ear will be discharged from the side of the machine upon the elevator 41 immediately subsequent to the removal of the husks.

What I claim is—

1. In a husking-machine, the combination with a resiliently-supported finger-board having prongs thereon; of a rotatable pronged disk above and adapted to coöperate with the pronged finger-board, and means upon the disk for removing material from the finger-board at each rotation of the disk.

2. In a husking-machine, the combination with a finger-board having prongs extending therefrom; of a plurality of pronged disks rotatably mounted above the finger-board, and means upon the disks for removing material from the board at each rotation of the disks.

3. The combination with a finger-board having husk-engaging devices thereon; of a plurality of rotatable disks disposed above the finger-board, husk-engaging devices thereon, and means upon the disks adapted to work between the fingers of the board and remove material therefrom during the rotation of the disks.

4. In a husking-machine, the combination with a resiliently-supported finger-board having husk-engaging devices thereon; of a plurality of rotatable disks above the fingers of the board, husk-engaging devices thereon, and fingers extending from the disks and adapted to work between the fingers of the board.

5. In a husking-machine, the combination with a hinged finger-board having husk-engaging devices thereon, and a resilient support for said board; of rotatable husk-engaging devices mounted above the fingers of the board, and fingers rotatable with said devices and adapted to work between the fingers of the board.

6. In a husking-machine, the combination with a hinged finger-board having husk-engaging devices thereon, and a resilient support for said board; of rotatable husk-engaging devices mounted above the fingers of the board, and means rotatable with said husk-engaging devices for removing material from the fingers at the completion of every revolution of the husk-engaging devices.

7. In a husking-machine, the combination with a finger-board having husk-engaging devices thereon; of a plurality of disks rotatably mounted above the board, husk-engaging devices thereon, and inclined receiver-fingers upon the finger-board and extending between the disks.

8. In a husking-machine, the combination with a finger-board having husk-engaging devices thereon; of a plurality of disks rotatably mounted above the board, husk-engaging devices thereon, and receiver-fingers disposed between the disks and inclined over and beyond the end of the finger-board.

9. In a husking-machine, the combination with a rotatable brush and a stop-strip adjacent thereto; of a finger-board, husk-engaging devices thereon, a plurality of husk-engaging devices disposed above the finger-board, and means rotatable with the husk-engaging devices for discharging material from the finger-board and the brush at the completion of every revolution of said rotatable husk-engaging devices.

10. In a machine of the character described, the combination with mechanism for loosening husks; a rotatable brush and means for discharging the loosened husks upon the brush; of a stop-strip for limiting the movement of the husks around the brush, stripping devices, and means for conveying the husks longitudinally upon the brush and into engagement with the stripping devices.

11. In a husking-machine, the combination with mechanism for loosening husks, a rotatable brush, and means for discharging the husks upon the brush; of a stop-strip for limiting the movement of the husks around the brush, meshing stripping-rolls adjacent one end of the brush, and means for conveying husks longitudinally upon the brush and stop-strip and into engagement with the stripping-rolls.

12. In a machine of the character described, the combination with mechanism for loosening husks, a rotatable brush, and means for discharging the husks upon the brush; of a stop-strip adjacent and extending longitudinally of the brush, stripping devices adjacent one end of the brush, an endless conveyer for moving husks longitudinally upon the brush and stop-strip and into engagement with the stripping devices, and means for rigidly supporting the conveyer above the brush.

13. In a machine of the character described, the combination with mechanism for loosening husks, a rotatable brush, and means for discharging husks from said mechanism and the brush; of a stop-strip adjacent and extending longitudinally of the brush, means coöperating with the stop-strip for forming an ear-receiving, supporting-channel, stripping devices adjacent one end of the brush, and a conveyer extending longitudinally of the channel for conveying husks longitudinally upon the brush and through the channel during the rotation of the brush.

14. In a machine of the character described, the combination with mechanism for loosening husks; of a rotatable brush, means for discharging material from the loosening mechanism and the brush, a stop-strip adjacent and extending longitudinally of the brush, means coöperating with said strip and forming an ear-receiving channel, meshing stripping-rolls adjacent one end of the brush and below the channel, and a conveyer disposed within and adapted to conduct material longitudinally of the channel during the rotation of and while supported by the brush and stripping-rolls.

15. In a husking-machine, the combination with husk-loosening mechanism, a rotatable brush, and means for delivering material from said mechanism to the brush; of a stop-strip adjacent and extending longitudinally of the brush, means coöperating with said strip for forming a husk-receiving channel above the brush, a stripping-roll adjacent one end of the brush and below the channel, a resiliently-mounted stripping-roll meshing with the first-mentioned roll, and means for conveying material longitudinally upon the brush and first-mentioned stripping-roll during the rotation thereof.

16. In a machine of the character described, the combination with husk-loosening mechanism, a brush, and means for discharging material from said mechanism to the brush; of a stop-strip extending longitudinally of and adapted to support material upon the brush, means coöperating with said strip to form a husk-receiving channel, a husking-roll adjacent one end and rotatable with the brush, a resiliently-supported, secondary husking-roll meshing with the first-mentioned roll, an endless conveyer mounted longitudinally within the channel, and husk-engaging fingers extending from the conveyer.

17. In a machine of the character described, the combination with husk-loosening mechanism, a brush, and means for discharging material from said mechanism to the brush; of a stop-strip extending longitudinally of and adapted to support material upon the brush, means coöperating with said strip to form a husk-receiving channel, a husking-roll adjacent one end and rotatable with the brush, a resiliently-supported, secondary husking-roll meshing with the first-mentioned roll, an endless conveyer mounted longitudinally within the channel, husk-engaging fingers extending from the conveyer, guides within the channel, and means upon the conveyer adapted to be engaged and to be supported by the guides.

In testimony whereof I have signed my name to this specification in the presence of two subscribing witnesses.

NATHAN MALONE.

Witnesses:
HENRY SCOTT,
WILLIAM MALONE.